United States Patent [19]
Bailey et al.

[11] Patent Number: 5,709,414
[45] Date of Patent: Jan. 20, 1998

[54] HOSE CLAMP CONNECTION AND METHOD

[75] Inventors: Mark R. Bailey, Madison; David P. Tickle, Summerfield, both of N.C.

[73] Assignee: Camco Manufacturing Inc., Greensboro, N.C.

[21] Appl. No.: 565,784

[22] Filed: Dec. 1, 1995

[51] Int. Cl.$^6$ ............................................. F16L 33/00
[52] U.S. Cl. ........................... 285/242; 285/251; 285/903; 24/274 R
[58] Field of Search ..................... 285/251, 903, 285/244; 24/274 R, 274 WB, 283, 26, 27, 28

[56] References Cited

U.S. PATENT DOCUMENTS

| | | | |
|---|---|---|---|
| 1,977,219 | 10/1934 | Williams | 285/251 X |
| 2,861,527 | 11/1958 | Phillips | 285/903 X |
| 3,239,254 | 3/1966 | Campbell | 285/903 X |
| 4,061,368 | 12/1977 | Auriemma | 285/903 X |
| 4,280,722 | 7/1981 | Guptil et al. | 24/27 X |
| 4,660,860 | 4/1987 | Todd | 285/12 |
| 4,688,833 | 8/1987 | Todd | 285/175 |
| 4,708,370 | 11/1987 | Todd | 285/12 |
| 5,056,834 | 10/1991 | Scott | 285/903 X |
| 5,333,910 | 8/1994 | Bailey | 285/12 |
| 5,383,494 | 1/1995 | Caine | 285/903 X |

FOREIGN PATENT DOCUMENTS

| | | | |
|---|---|---|---|
| 28110 | 4/1907 | Austria | 285/251 |
| 392769 | 10/1908 | France | 285/244 |
| 1224248 | 6/1960 | France | 285/251 |
| 2602572 | 2/1988 | France | 285/244 |
| 2600226 | 7/1977 | Germany | 285/903 |
| 210685 | 8/1989 | Japan | 285/903 |
| 813071 | 3/1981 | U.S.S.R. | 285/903 |
| 1345737 | 2/1974 | United Kingdom | 285/251 |

*Primary Examiner*—Dave W. Arola

[57] ABSTRACT

A sewer hose connection utilizes a helical clamp which can be manually turned around a convoluted sewer hose placed onto a rigid fitting. The helical clamp is formed from wire and is contained in an annular groove of the fitting. The helical clamp positioned over a typical RV sewer hose end convolution having a wire spiral can be rotated to draw the hose further onto the fitting to form a sealing and mechanical connection.

12 Claims, 4 Drawing Sheets

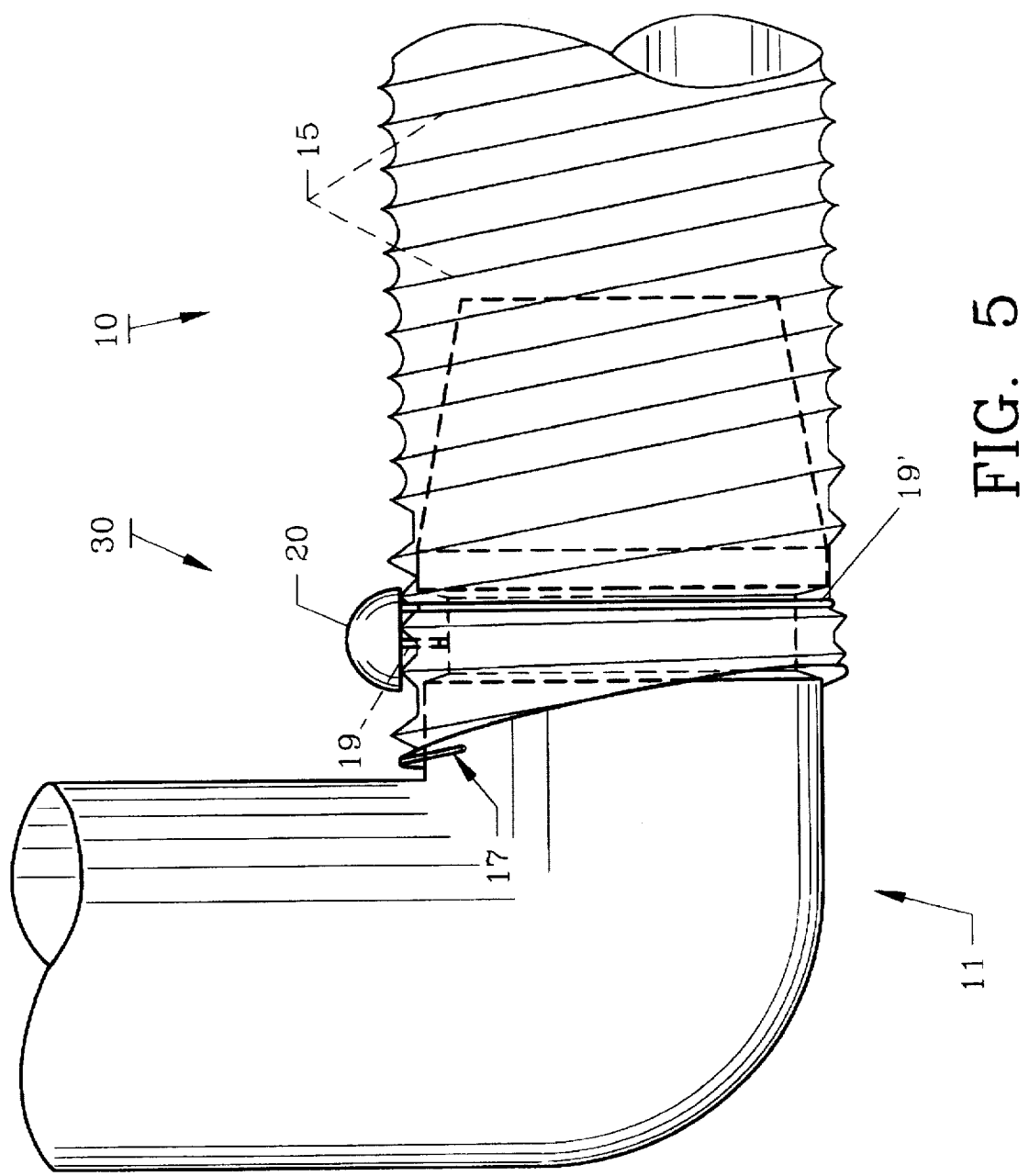

HOSE CLAMP CONNECTION AND METHOD

FIELD OF THE INVENTION

A hose connection is provided for use with convoluted sewer hoses as are commonly used with RV's (recreational vehicles). A helical clamp is contained within a groove on a rigid sewer fitting and the hose can be drawn tightly onto the fitting by manually rotating the helical clamp around the hose convolutions.

BACKGROUND AND OBJECTIVES OF THE INVENTION

The use of a flexible sewer hose for joining the sewer tank of an RV to a sewer facility at an RV park, campground or other location has become increasingly popular in recent years. However, the hose connections must be securely made to prevent leakage of fluids, gases and otherwise for the safety, health and convenience of campers and other camp personnel. As such connections are generally only temporary, as for a few days or a few weeks, depending on the length of the campsite stay, campground owners and maintenance personnel must constantly inspect the sewer connections to insure safety and prevent health hazards at the camping sites. One particular problem has been the connection of the sewer hose end to the RV sewer tank adapter which is generally formed from a rigid plastic material. Whether this connection is made in the field, campsite or factory, it must be secure to prevent leakage and must sustain the handling required of the fitting and hose during normal or sometimes adverse use.

Thus, with the problems and disadvantages associated with conventional sewer hose connections, it is an objective of the present invention to provide a secure sewer hose connection which is safe and easy to make by skilled and relatively unskilled persons.

It is another objective of the invention to provide a helical clamp including a ring which can be used to tighten the end of a convoluted sewer hose onto a rigid sewer adapter fitting.

It is another objective of the present invention to provide a method for joining a conventional sewer hose to a rigid fitting with minimum training and effort.

It is another objective of the invention to provide a helical clamp which includes a cover member over radial extensions for grasping the clamp during manipulation thereof.

Various other objectives and advantages of the invention will become apparent to those skilled in the art as a more detailed description is set forth below.

SUMMARY OF THE INVENTION

The invention described herein provides the aforesaid objectives and benefits for connections made with flexible hoses, particularly convoluted sewer hoses as are utilized in the RV industry. Such sewer hoses are generally formed from a polyvinyl chloride film and contain a spiral steel wire which provides the necessary rigidity to maintain the open diameter of the hose. It is common to attach the distal end of the sewer hose to a selected septic tank or sewage treatment facility at a campground or park with the proximal end of the sewer hose joined to a rigid adapter which is affixed to the sewer tank of an RV. The connection between the flexible sewer hose and the rigid adapter is often troublesome and must be secure to prevent leakage of fluids and noxious fumes which may cause a health hazard. The invention as described herein provides a safe, secure connection by use of an adapter fitting having an annular groove containing a rotatable helical clamp formed from a rigid wire-like member. The helical clamp includes a pair of radial extensions which are spaced apart to allow a sewer hose convolution to pass therebetween. Thus, by introducing the exposed end of the spiral hose wire between the radial extensions, the helical clamp can then be rotated within the groove, along the hose convolution causing the hose to be drawn increasingly onto the rigid fitting and forming a tightly sealed connection therewith. As the groove maintains the position of the helical clamp along the fitting, the motion between the clamp and sewer hose draws the sewer hose increasingly onto the fitting and beyond the groove as needed.

BRIEF DESCRIPTION OF THE DRAWINGS

FIG. 5 features the sewer hose and fitting as fully connected and assembled.

DETAILED DESCRIPTION OF THE PREFERRED EMBODIMENTS AND OPERATION OF THE INVENTION

Figure 1:
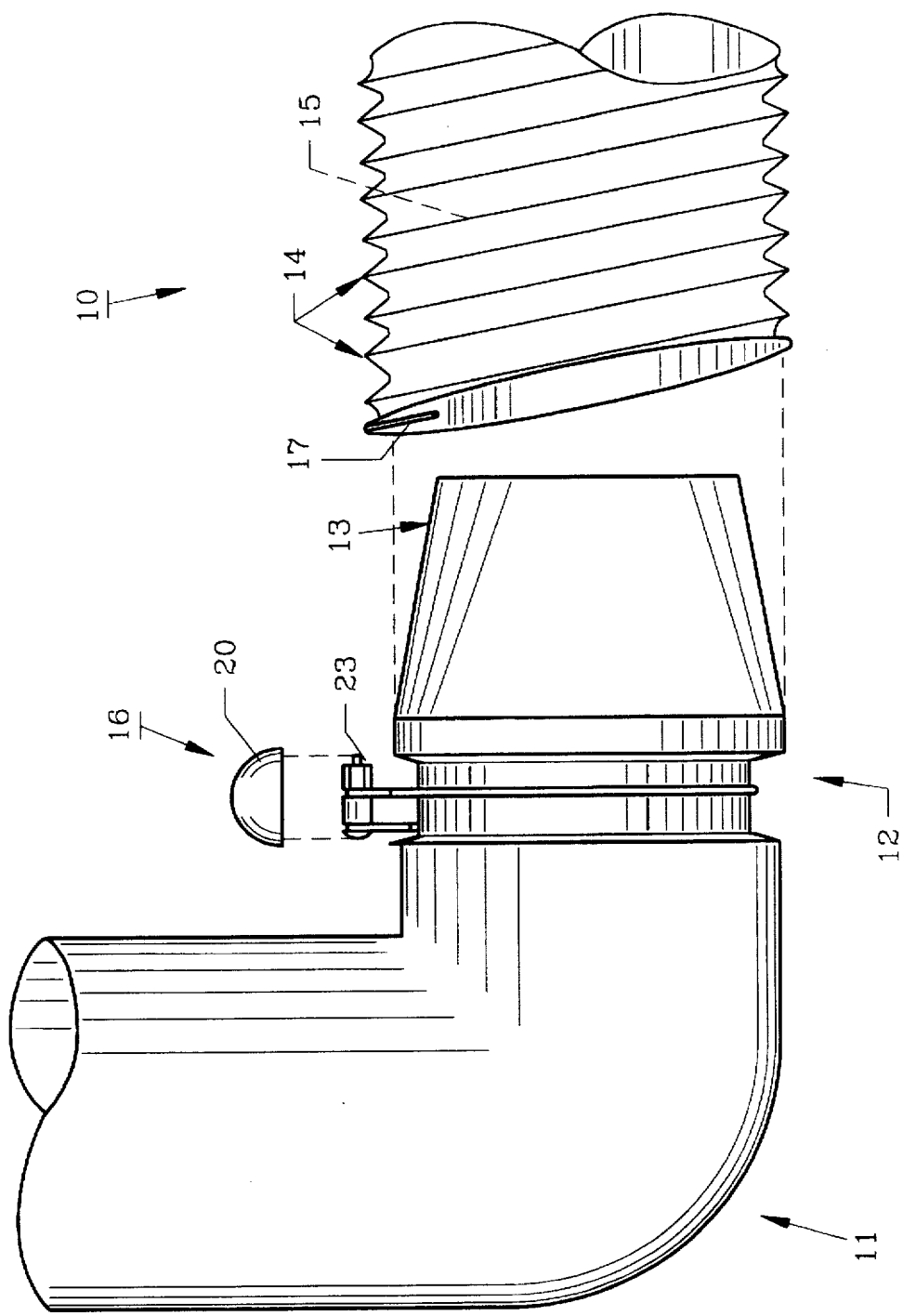
FIG. 1 illustrates a conventional sewer hose and a partial rigid fitting with the helical clamp thereon, prior to connection therewith.
Figure 2:
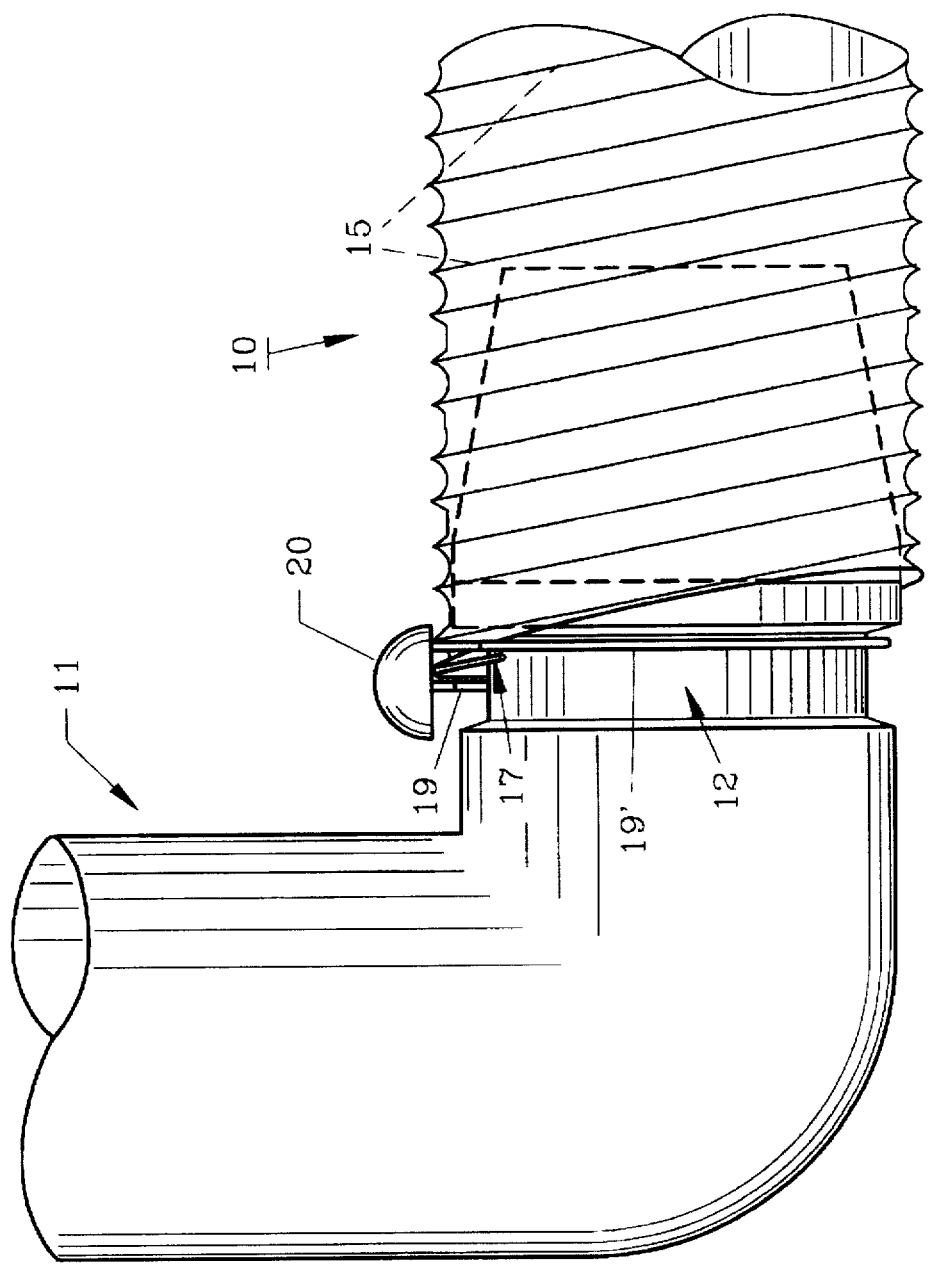
FIG. 2 shows the sewer hose and fitting during initial assembly.

For a better understanding of the invention and its operation, turning now to the drawings, FIG. 1 shows a conventional polyvinyl chloride sewer hose 10 exploded from a conventional sewer hose adapter fitting 11 as would be joined to an RV sewer tank. Fitting 11 has a groove 12 shown in more detail in FIG. 2 and is formed from a rigid plastic material or otherwise and includes a terminal end 13 sized to fit within the inner diameter of sewer hose 10 shown therein. Sewer hose 10 includes a plurality of convolutions 14 formed by spiral wire 15 as is standard in the hose industry. Helical clamp 16, the preferred form, is shown in groove 12 and as seen in FIG. 2, helical clamp 16 has an inside diameter smaller than the outer diameter of fitting 11 to prevent removal of clamp 16 from groove 12 during use.

Figure 4:
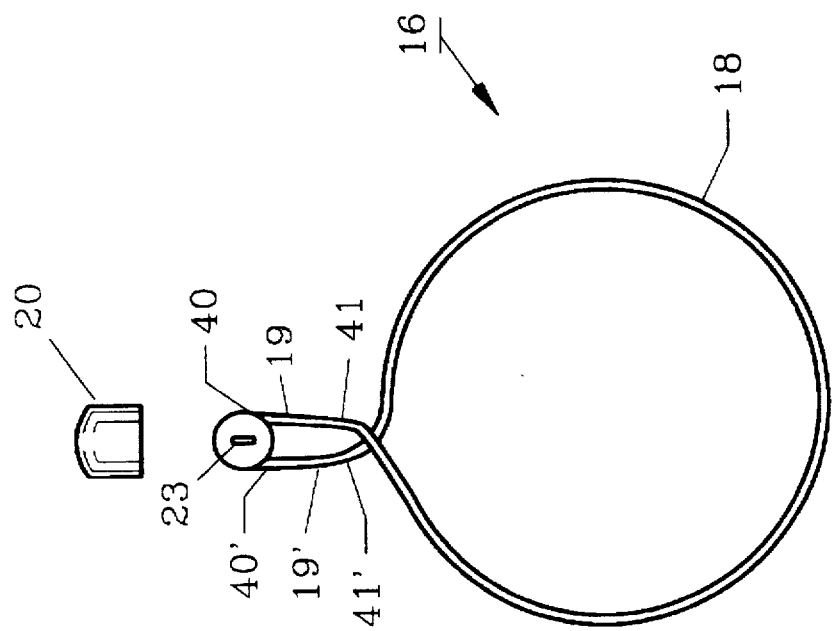
FIG. 4 depicts the helical clamp as shown in FIG. 3 in a side view with the terminal ends of the ring separated.
Figure 3:
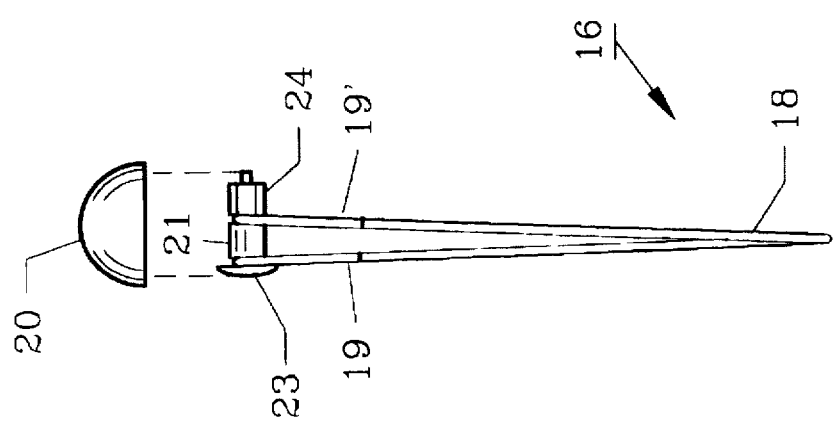
FIG. 3 demonstrates a frontal view of the helical clamp removed from the fitting and with the cover removed therefrom.

As shown in FIG. 3, helical clamp 16 includes a circular ring portion 18 and a pair of radial extensions 19, 19'. Cap 20 may be molded or formed from plastic and covers the terminal ends of extensions 19, 19'. A front view of helical clamp 16 is seen in FIG. 4 which demonstrates the spacing between radial extensions 19 and 19'. This spacing is provided and maintained by spacer 21 held in place by threaded member 23 and nut 24 affixed thereto. This spacing allows end 17 of hose spiral wire 15 as shown in FIG. 2 to be threaded between extensions 19 and 19'. During use, once wire end 17 is positioned between radial extensions 19, 19', helical clamp 16 is then rotated manually without tools, onto sewer hose 10 which causes sewer hose 10 to move into groove 12 and onto fitting 11 without damage to spiral wire 15. As further shown, helical clamp 16 is formed to accommodate a standard left-handed convoluted hose. However, helical clamp 16 could be changed by reversing ends 19 and 19' to accommodate a right-handed convoluted hose as are also commercially available.

Hose connection 30, the preferred connection, as illustrated in FIG. 5 is a result of rotating helical clamp 16 on fitting 11 and onto convoluted sewer hose 10. As shown, helical clamp 16 remains within groove 12 and sewer hose 10 has now moved further onto fitting 11 than seen in FIG. 2, in this, the preferred method of assembly. Sewer hose 10 is now tightly pressed to fitting 11 within groove 12 and will not allow liquids or gases to escape therearound as required by health and safety regulations. Also connection 30 will not loosen by usual operating stresses or forces applied to sewer hose 10. After use, if it is desirable to remove sewer hose 10 from fitting 11, helical clamp 16 can be grasped by cap 20 and manually rotated in an opposite direction to thereby remove hose 10 without damage or destruction thereto. In an alternative embodiment of the helical clamp, a flexible flap or cover member may be attached to the body portion of the clamp to cover the hose convolutions proximate thereto to protect the user from possible sharp wire end 17 and for appearance purposes.

The examples and illustrations provided herein are merely for explanatory purposes and are not intended to limit the scope of the appended claims as those skilled in the art may provide for left-handed or right-handed convoluted hoses as needed.

We claim:

1. A helical clamp to secure a convoluted hose to a fitting, said clamp comprising: a helical ring, a first and a second radial extension, each of said radial extensions including an upper end and a lower end, the lower end of each radial extension connected to said helical ring, an elongated member connecting the upper end of the first radial extension to the upper end of the second radial extension, said radial extensions separated along the axis of said helical ring to allow a hose convolution to fit between said radial extensions.

2. The clamp of claim 1 wherein said ring is formed from metal.

3. The clamp of claim 1 wherein said ring is formed from wire.

4. The clamp of claim 1 wherein said elongated member is threaded.

5. The clamp of claim 1 further comprising a spacer, said spacer positioned around said elongated member and between said radial extensions to maintain the axial separation between said radial extensions.

6. The clamp of claim 5 further comprising an extension cap, said extension cap positioned over said radial extensions.

7. A method of connecting a convoluted hose to a fitting with a helical clamp, the fitting defining an annular groove, the method comprising the steps of:

(a) positioning the helical clamp into the annular groove so that the circumference of the clamp engages the annular groove, (b) placing the fitting into the hose end with the hose end proximate the helical clamp, and (c) rotating the helical clamp within the groove and around the fitting and onto the hose end to engage a convolution of the hose and to draw the hose through the helical clamp.

8. The method of claim 7 wherein rotating the helical clamp around the fitting comprises rotating the helical clamp around a hose convolution.

9. The method of claim 7 and including the step of rotating the helical clamp within the fitting groove until the hose end is drawn past the grove.

10. A convoluted hose connection comprising in combination: a flexible convoluted hose, a rigid fitting, said fitting defining an annular groove, a helical clamp, said clamp having a diameter approximately equal to the diameter of said annular groove, said clamp positioned in said groove and around a convolution of said hose positioned in said groove, said clamp trapped by said groove so that said clamp remains in said groove upon relative rotation of said clamp and groove.

11. The convoluted hose connection combination of claim 10 wherein said helical clamp is formed from metal.

12. The convoluted hose connection combination of claim 10 wherein said flexible hose comprises a polyvinyl sewer hose.

* * * * *